(12) United States Patent
Miyoshi

(10) Patent No.: US 10,176,112 B2
(45) Date of Patent: Jan. 8, 2019

(54) INFORMATION PROCESSING DEVICE, METHOD, AND NON-TRANSITORY COMPUTER-READABLE RECORDING MEDIUM STORING INFORMATION PROCESSING PROGRAM FOR LOADING CODE INTO RECONFIGURABLE INTEGRATED CIRCUIT

(71) Applicant: FUJITSU LIMITED, Kawasaki-shi, Kanagawa (JP)

(72) Inventor: Takashi Miyoshi, Ohta (JP)

(73) Assignee: FUJITSU LIMITED, Kawasaki (JP)

( * ) Notice: Subject to any disclaimer, the term of this patent is extended or adjusted under 35 U.S.C. 154(b) by 55 days.

(21) Appl. No.: 15/453,131

(22) Filed: Mar. 8, 2017

(65) Prior Publication Data

US 2017/0351617 A1    Dec. 7, 2017

(30) Foreign Application Priority Data

Jun. 3, 2016    (JP) .................................. 2016-112044

(51) Int. Cl.
*G06F 12/1027* (2016.01)
*G06F 3/06* (2006.01)
*G06F 12/1009* (2016.01)
*G06F 15/78* (2006.01)
*G06F 9/445* (2018.01)
(Continued)

(52) U.S. Cl.
CPC ........ *G06F 12/1027* (2013.01); *G06F 3/0604* (2013.01); *G06F 3/0659* (2013.01); *G06F 3/0673* (2013.01); *G06F 9/44521* (2013.01); *G06F 9/5005* (2013.01); *G06F 9/54* (2013.01); *G06F 12/1009* (2013.01);
(Continued)

(58) Field of Classification Search
None
See application file for complete search history.

(56) References Cited

U.S. PATENT DOCUMENTS 5,542,077 A  *  7/1996  Johnson .............. G06F 11/1417
                                                    713/300
7,873,830 B2 *  1/2011  Fayad  ..................... G06F 21/72
                                                    380/277
(Continued)

FOREIGN PATENT DOCUMENTS

JP    2006-215592    8/2006
JP    2013-45219     3/2013

*Primary Examiner* — Sean D Rossiter
*Assistant Examiner* — Charles J Choi
(74) *Attorney, Agent, or Firm* — Fujitsu Patent Center

(57) ABSTRACT

An information processing device, includes: a reconfigurable integrated circuit that, by being loaded with code expressing a configuration of a circuit, functions as the circuit; a memory that stores information indicating that the code is loaded into the reconfigurable integrated circuit, and resource information indicating an unused region in which circuit generation is available inside the reconfigurable integrated circuit; and a processor that searches a translation lookaside buffer (TLB) in which a virtual address associated with the code is associated with a physical address of the memory, determines, when the virtual address hits in the TLB, that the code is loaded, and generates, when the virtual address does not hit in the TLB, the circuit expressed by the code in the unused region indicated by the resource information.

18 Claims, 7 Drawing Sheets

(51) Int. Cl.
  *G06F 9/50* (2006.01)
  *G06F 9/54* (2006.01)
(52) U.S. Cl.
  CPC .. *G06F 15/7867* (2013.01); *G06F 2212/1021* (2013.01); *G06F 2212/684* (2013.01)

(56) References Cited

U.S. PATENT DOCUMENTS

| | | | | |
|---|---|---|---|---|
| 2006/0143365 A1* | 6/2006 | Kikuchi | ............... | G06F 3/0614 711/103 |
| 2010/0070708 A1* | 3/2010 | Maruyama | ......... | G06F 12/1027 711/118 |
| 2012/0042036 A1* | 2/2012 | Lau | ........................ | G06F 8/61 709/217 |

* cited by examiner

FIG. 2

| ID | FPGANumber | RegionNumber | InUse | CodeNumber | ProcessID |
|---|---|---|---|---|---|
| 1 | 1 | 1 | YES | 1 | PID001 |
| 2 | 1 | 2 | NO | — | — |
| ... | ... | ... | ... | ... | ... |
| N | 2 | n | YES | 3 | PID005 |

122

INFORMATION PROCESSING DEVICE, METHOD, AND NON-TRANSITORY COMPUTER-READABLE RECORDING MEDIUM STORING INFORMATION PROCESSING PROGRAM FOR LOADING CODE INTO RECONFIGURABLE INTEGRATED CIRCUIT

CROSS-REFERENCE TO RELATED APPLICATION

This application is based upon and claims the benefit of priority of the prior Japanese Patent Application No. 2016-112044, filed on Jun. 3, 2016, the entire contents of which are incorporated herein by reference.

FIELD

The embodiment discussed herein is related to an information processing device, an information processing method, and a non-transitory computer-readable recording medium storing an information processing program.

BACKGROUND

As an acceleration of computing, there is provided a hybrid package of a central processing unit (CPU) and a field-programmable gate array (FPGA).

Related art is disclosed in Japanese Laid-open Patent Publication No. 2006-215592 and Japanese Laid-open Patent Publication No. 2013-45219.

SUMMARY

According to an aspect of the embodiments, An information processing device, includes: a reconfigurable integrated circuit that, by being loaded with code expressing a configuration of a circuit, functions as the circuit; a memory that stores information indicating that the code is loaded into the reconfigurable integrated circuit, and resource information indicating an unused region in which circuit generation is available inside the reconfigurable integrated circuit; and a processor that searches a translation lookaside buffer (TLB) in which a virtual address associated with the code is associated with a physical address of the memory, determines, when the virtual address hits in the TLB, that the code is loaded, and generates, when the virtual address does not hit in the TLB, the circuit expressed by the code in the unused region indicated by the resource information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of an FPGA resource table;

DESCRIPTION OF EMBODIMENT

For example, in a hybrid package of a CPU and an FPGA, the CPU and the FPGA are coupled by a memory-coherent bus, and the CPU and the FPGA share memory.

For example, there is provided an FPGA in which multiple regions are prepared in advance, and individual regions may be reprogrammed.

For example, the FPGA is programmed dynamically while an application is being executed.

For example, a coprocessor performs a check of whether or not a certain function is programmed into the FPGA. By having a processor check a result register in which the check result is stored, it is determined whether or not a certain function is executable by the FPGA. For example, since the register is checked when determining whether or not the certain function is executable by the FPGA, a checking of the register when performing a fine-grained process may become an overhead.

For example, whether or not code is loaded into a reconfigurable integrated circuit may be determined quickly.

Figure 1:
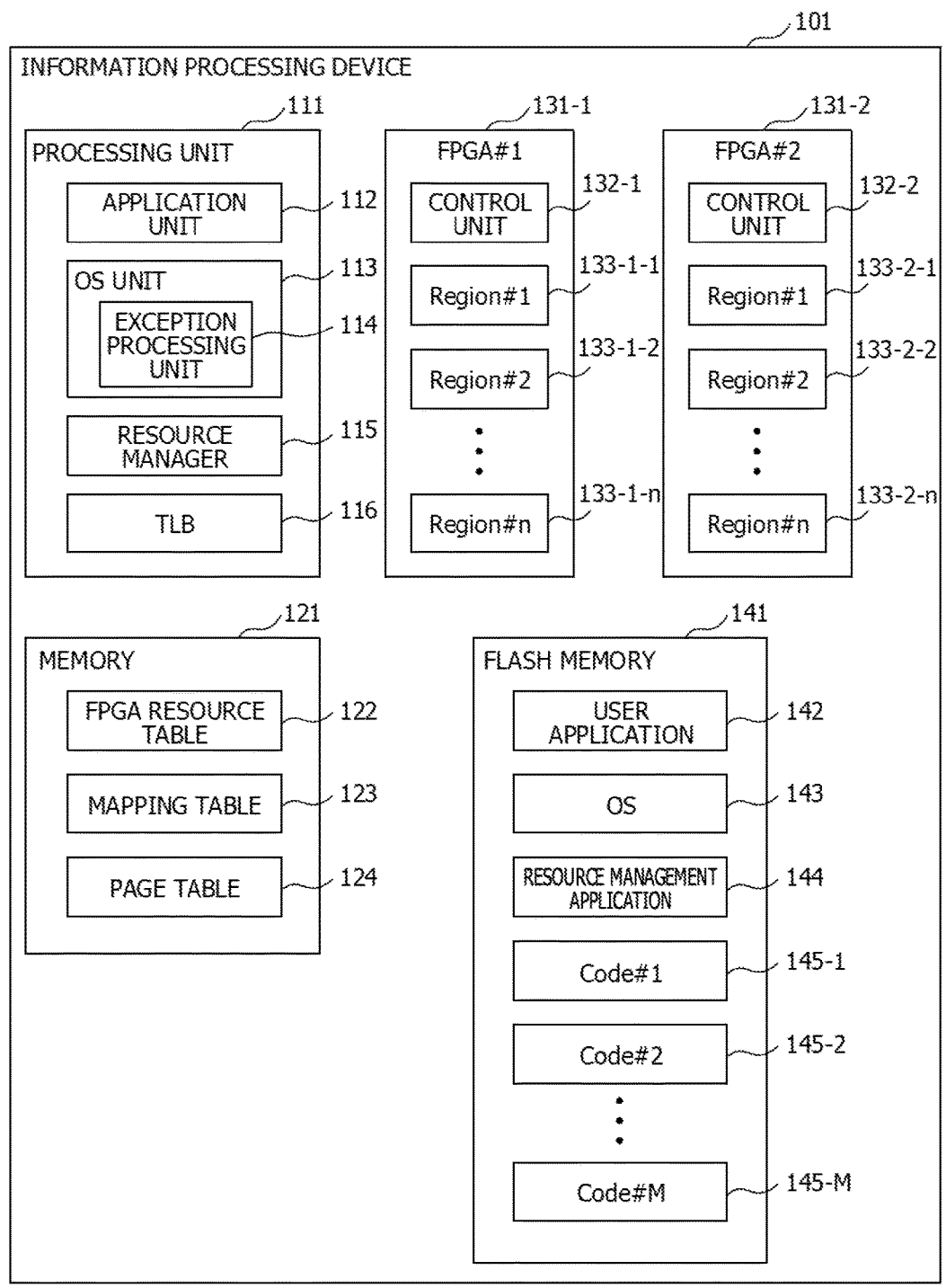
FIG. 1 illustrates an example of an information processing device.

FIG. 1 illustrates an example of an information processing device.

The information processing device 101 is provided with a processing unit 111, memory 121, FPGAs 131-$i$ (where i=1 to 2), and flash memory 141. The information processing device 101 may be a computer, such as a personal computer (PC) or a server, for example.

The processing unit 111 is a processing device that controls the information processing device 101 overall. The processing unit 111 executes various processes by loading a user application 142 and an operating system (OS) 143 into the memory 121. The processing unit 111 is provided with an application unit 112, an OS unit 113, a resource manager 115, and a translation lookaside buffer (TLB) 116. The processing unit 111 is a CPU, for example.

The application unit 112 loads the user application 142 from the flash memory 141 into the memory 121, and executes the user application 142. In the case of wanting to perform a certain process using a certain circuit generated by loading certain code 145-$k$ into the FPGA 131-$i$, the application unit 112 checks whether the certain code 145-$k$ is loaded into the FPGA 131-$i$. The application unit 112 reads out a value stored in a virtual address associated with the certain code 145-$k$, and according to the read-out value, determines whether or not the certain code 145-$k$ is loaded into the FPGA 131-$i$. For example, the application unit 112 determines whether or not the FPGA 131-$i$ is usable (for example, whether or not hardware processing using the FPGA 131-$i$ is available). For example, if a value of 1 is read out from the virtual address associated with the certain code 145-$k$, the application unit 112 determines that the certain code 145-$k$ is loaded into the FPGA 131-$i$ (for example, the FPGA 131-$i$ is usable). If a value of 0 is read out from the virtual address associated with the certain code 145-$k$, the application unit 112 determines that the certain code 145-$k$ is not loaded into the FPGA 131-$i$ (for example, the FPGA 131-$i$ is not usable).

The OS unit 113 loads the OS 143 from the flash memory 141 into the memory 121, and executes the OS 143. The OS unit 113 manages a page table 124.

The OS unit is provided with an exception processing unit 114. The exception processing unit 114 conducts an exception process when a mishit of the TLB occurs. The exception processing unit 114 calls the resource manager 115 when a mishit of the TLB occurs.

The resource manager 115 loads a resource management application 144 from the flash memory 141 into the memory 121, and executes the resource management application 144. The resource manager 115 references an FPGA resource table 122, and depending on the condition of the FPGA 131-$i$, writes the code 145-$k$ into the FPGA 131-$i$. For example, the resource manager 115 transmits an instruction and the code 145-$k$ to the FPGA 131-$i$, and a control unit 132-$i$ of the FPGA 131-$i$ loads the received code 145-$k$ into a region 133-$i$-$j$. For example, the control unit 132-$i$ configures a circuit indicated by the received code 145-$k$ in the region 133-$i$-$j$. The resource manager 115 sets the FPGA resource table 122 and a mapping table 123.

The TLB 116 is a cache that stores information associating a virtual address with a physical address of the memory 121. Part of the information of the page table 124 is stored in the TLB 116. Searches in the TLB 116 are executed in hardware.

The memory 121 is a storage device that temporarily stores programs and data used by the information processing device 101. The memory 121 is dynamic random access memory (DRAM) or the like, for example. The memory 121 stores the FPGA resource table 122, the mapping table 123, and the page table 124.

The FPGA resource table 122 is a table describing states such as the usage conditions of the FPGA 131-$i$.

The mapping table 123 is a table describing the correspondence relationship between the code 145-$k$ and a virtual address. The mapping table 123 is set by the resource manager 115, and is correspondingly updated if the code 145-$k$ is stored in the flash memory 141 or removed from the flash memory 141. Each virtual address associated with each code 145-$k$ may be set by the resource manager 115 so values do not overlap.

The page table 124 is a table describing correspondence relationships between virtual addresses and physical addresses of the memory 121. The page table 124 is used by a paging-style virtual memory system in the OS 143. In the page table 124 are described correspondence relationships between the virtual addresses in a region obtained by partitioning virtual address space into a region of a certain size, called a "page", and physical addresses of the memory 121. The number of the page table 124 is an example, and is not limited thereto.

The FPGA 131-$i$ is provided with a control unit 132-$i$ and a region 133-$i$-$j$ (where $j=1$ to $n$). The FPGA 131-$i$ is an example of a reconfigurable integrated circuit.

The control unit 132-$i$ receives an instruction and the code 145-$k$ from the processing unit 111, and writes (loads) the received code 145-$k$ into the region 133-$i$-$j$. For example, the control unit 132-$i$ configures a circuit indicated by the received code 145-$k$ in the region 133-$i$-$j$. The above process may also be called configuration.

The region 133-$i$-$j$ is a preset region in which the circuit indicated by the code 145-$k$ is configured. The control unit 132-$i$ is able to rewrite the region 133-$i$-$j$ individually. The region 133-$i$-$j$ may also be designated the region #$j$.

The number of the FPGA 131-$i$ and the number of the region 133-$i$-$j$ are an example, and is not limited thereto.

The flash memory 141 is a non-volatile semiconductor storage device that stores programs and data used by the information processing device 101. The flash memory 141 stores the user application 142, the OS 143, the resource management application 144, and the code 145-$k$ (where $k=1$ to M).

The user application 142 is a program that executes a process demanded by the user.

The OS 143 is a program that controls the information processing device 101, sets the page table 124, performs an exception process, and the like.

The resource management application 144 is a program that performs management operations such as writing the code 145-$k$ into the FPGA 131-$i$, and updating the FPGA resource table 122.

The code 145-$k$ is information that indicates a circuit to be configured in the region 133-$i$-$j$ of the FPGA 131-$i$. Hereinafter, the code 145-$k$ may also be designated Code#$k$.

FIG. 2 illustrates an example of an FPGA resource table. The FPGA resource table 122 describes the following fields in association with each other: ID, FPGANumber, RegionNumber, InUse, CodeNumber, and ProcessID.

ID is a serial number assigned to the region 133-$i$-$j$. FPGANumber is a number identifying the FPGA 131-$i$. RegionNumber is a number identifying the region 133-$i$-$j$.

InUse indicates whether or not the region 133-$i$-$j$ is in use, such as whether or not the code 145-$k$ is loaded into the region 133-$i$-$j$, for example. "Yes" indicates that the region 133-$i$-$j$ is in use, while "No" indicates that the region 133-$i$-$j$ is not in use. For example, when InUse is "No", a circuit is generated by loading the code 145-$k$ into the corresponding region 133-$i$-$j$, and executed, such as hardware processing, for example.

CodeNumber indicates the code 145-$k$ loaded into the region 133-$i$-$j$. For example, the CodeNumber $k$ may indicate the code 145-$k$.

ProcessID indicates the ID (identifier) of a process being used by the OS 143 that is using a circuit generated by the code 145-$k$ loaded into the region 133-$i$-$j$.

The resource manager 115 sets InUse to "No" when the process indicated by ProcessID included in the FPGA resource table 122 is not currently running. The resource manager 115 removes from the TLB 116 the physical address corresponding to the virtual address that corresponds to the CodeNumber for the process corresponding to the ProcessID that is not currently running.

Figure 3:
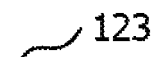
FIG. 3 illustrates an example of a mapping table.

FIG. 3 illustrates an example of a mapping table. The mapping table 123 includes fields describing a CodeNumber and an address in association with each other.

CodeNumber is a number identifying the code 145-$k$. For example, the CodeNumber $k$ indicates the code 145-$k$. Address indicates a virtual address.

Figure 4:
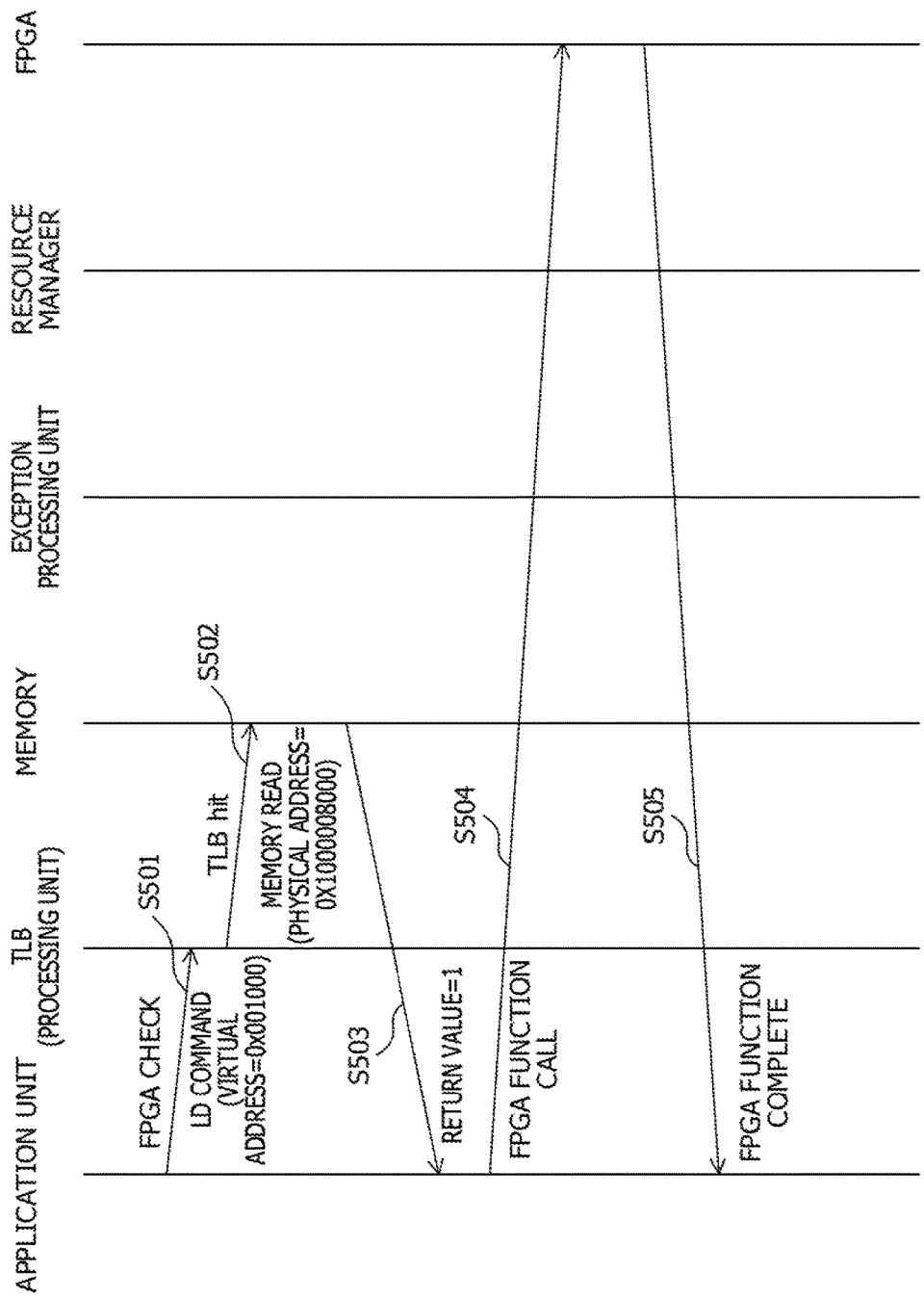
FIG. 4 illustrates an example of a sequence diagram when code has already been loaded into an FPGA.

FIG. 4 illustrates an example of a sequence diagram when code has already been loaded into an FPGA. FIG. 4 illustrates a case in which the user application 142 executes a certain process using Code#1. A value of 1 is stored in the physical address 0x1000008000 of the memory 121 corresponding to the virtual address 0x001000 corresponding to Code#1.

The application unit 112 issues a load (LD) command to read out information from the virtual address corresponding to Code#1 (operation S501). As illustrated in FIG. 3, the virtual address corresponding to Code#1 is 0x001000.

The processing unit 111 searches the TLB 116 based on the virtual address issued by the application unit 112 (operation S502). For example, suppose that the physical address 0x1000008000 corresponding to the virtual address 0x001000 is obtained as a search result (TLB hit). At the physical address 0x1000008000 of the memory 121, a value of 1 is stored, and the processing unit 111 returns to the application unit 112 the information (1) read out from the memory 121 (operation S503).

The application unit 112 receives 1 as the return value, and thus determines that the FPGA 131-*i* is usable (operation S504). The application unit 112 calls the FPGA function corresponding to Code#1 (operation S504). For example, the application unit 112 executes the circuit generated in the FPGA 131-*i* by Code#1. For example, the application unit 112 instructs the FPGA 131-*i* that includes that circuit generated by Code#1 to execute the circuit.

The FPGA 131-*i* executes the circuit generated by Code#1, and after execution terminates, transmits the execution result of the circuit generated by Code#1 to the application unit 112 (operation S505).

Figure 5:
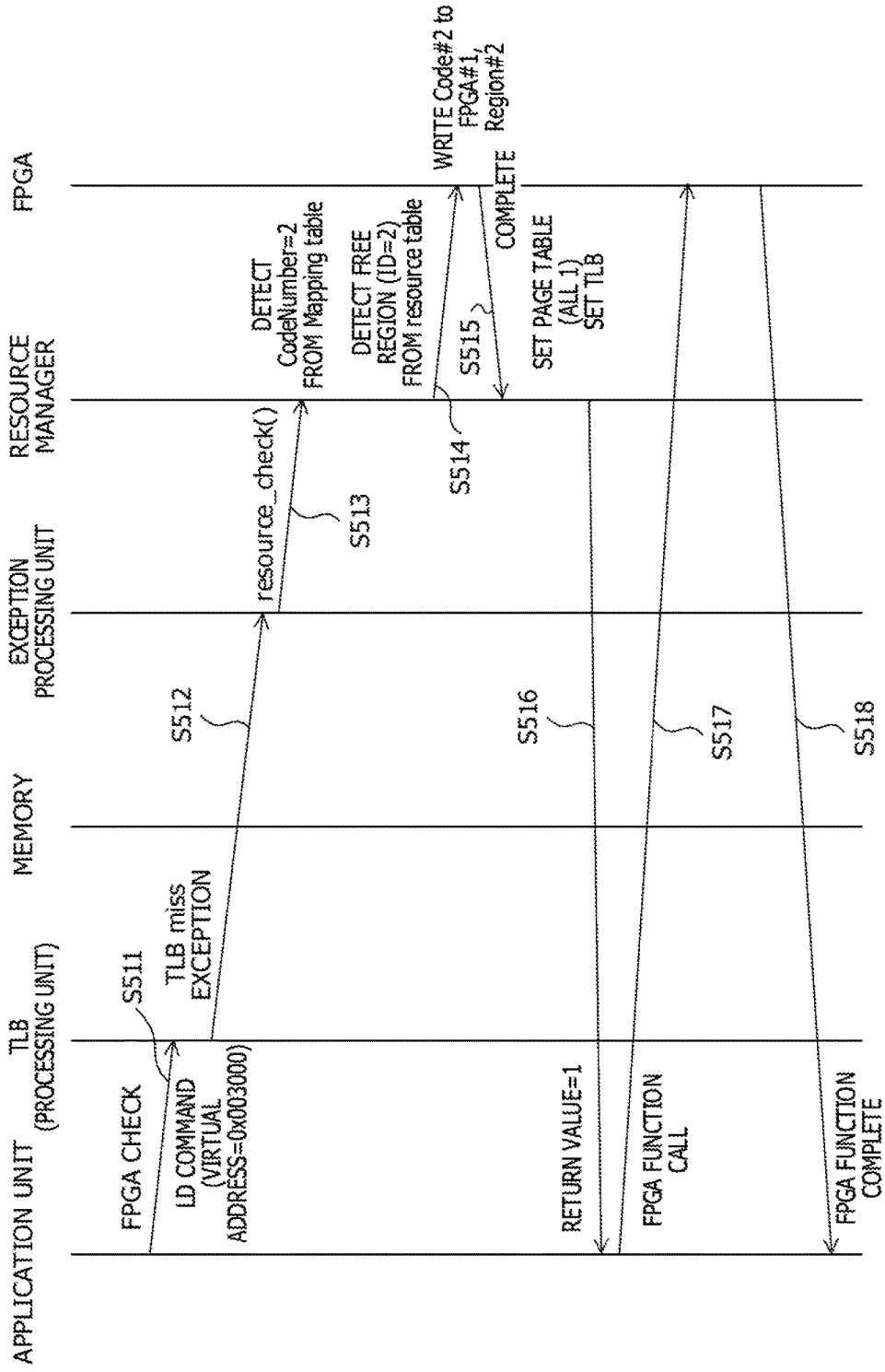
FIG. 5 illustrates an example of a sequence diagram when code is loaded into an FPGA.

FIG. 5 illustrates an example of a sequence diagram when code is loaded into an FPGA. FIG. 5 illustrates a case in which the user application 142 executes a certain process using Code#2.

The application unit 112 issues a load (LD) command to read out information from the virtual address corresponding to Code#1 (operation S511). As illustrated in FIG. 3, the virtual address corresponding to Code#2 is 0x003000.

The processing unit 111 searches the TLB 116 based on the virtual address issued by the application unit 112 (operation S512). For example, suppose that the physical address corresponding to the virtual address 0x003000 is not stored in the TLB (TLB miss). The processing unit 111 produces an interrupt, and calls the exception processing unit 114 (operation S512). The exception processing unit 114 calls the resource manager 115 (operation S513).

The resource manager 115 references the mapping table 123, and detects the CodeNumber 2 corresponding to the virtual address 0x003000 (operation S514). The resource manager 115 references the FPGA resource table 122, and searches for an unused region (operation S514). For example, as an unused region, the region corresponding to the ID of 2 (FPGANumber=1, RegionNumber=2), such as the region 133-1-2 of the FPGA 131-1, for example, may be detected. For example, if there are multiple unused regions, the region with the smallest ID from among the unused regions may be detected. The resource manager 115 transmits Code#2 to the FPGA 131-1, and instructs the FPGA 131-1 to write (load) Code#2 into the region 133-1-2 (operation S514).

The control unit 132-1 of the FPGA 131-1 writes (loads) Code#2 into the region 133-1-2 (operation S515). As a result, the circuit expressed by Code#2 is generated in the region 133-1-2. When loading finishes, the control unit 132-1 notifies the resource manager 115 that the load is complete (operation S515).

The resource manager 115 sets the page that includes the virtual address 0x003000 and the corresponding physical address in the page table 124, and writes a value of 1 at the physical address of the memory 121 corresponding to the virtual address of the page that includes the virtual address 0x003000. The resource manager 115 returns a value of 1 to the application unit 112 (operation S516). The resource manager 115 registers the physical address corresponding to the virtual address 0x003000 in the TLB 116 (operation S516).

The application unit 112 receives 1 as the return value, and thus determines that the FPGA 131-*i* is usable (operation S517). The application unit 112 calls the FPGA function corresponding to Code#2 (operation S517). For example, the application unit 112 executes the circuit generated in the FPGA 131-*i* by Code#2. For example, the application unit 112 instructs the FPGA 131-*i* that includes that circuit generated by Code#2 to execute the circuit.

The FPGA 131-*i* executes the circuit generated by Code#2, and after execution terminates, transmits the execution result of the circuit generated by Code#2 to the application unit 112 (operation S518).

Figure 6:
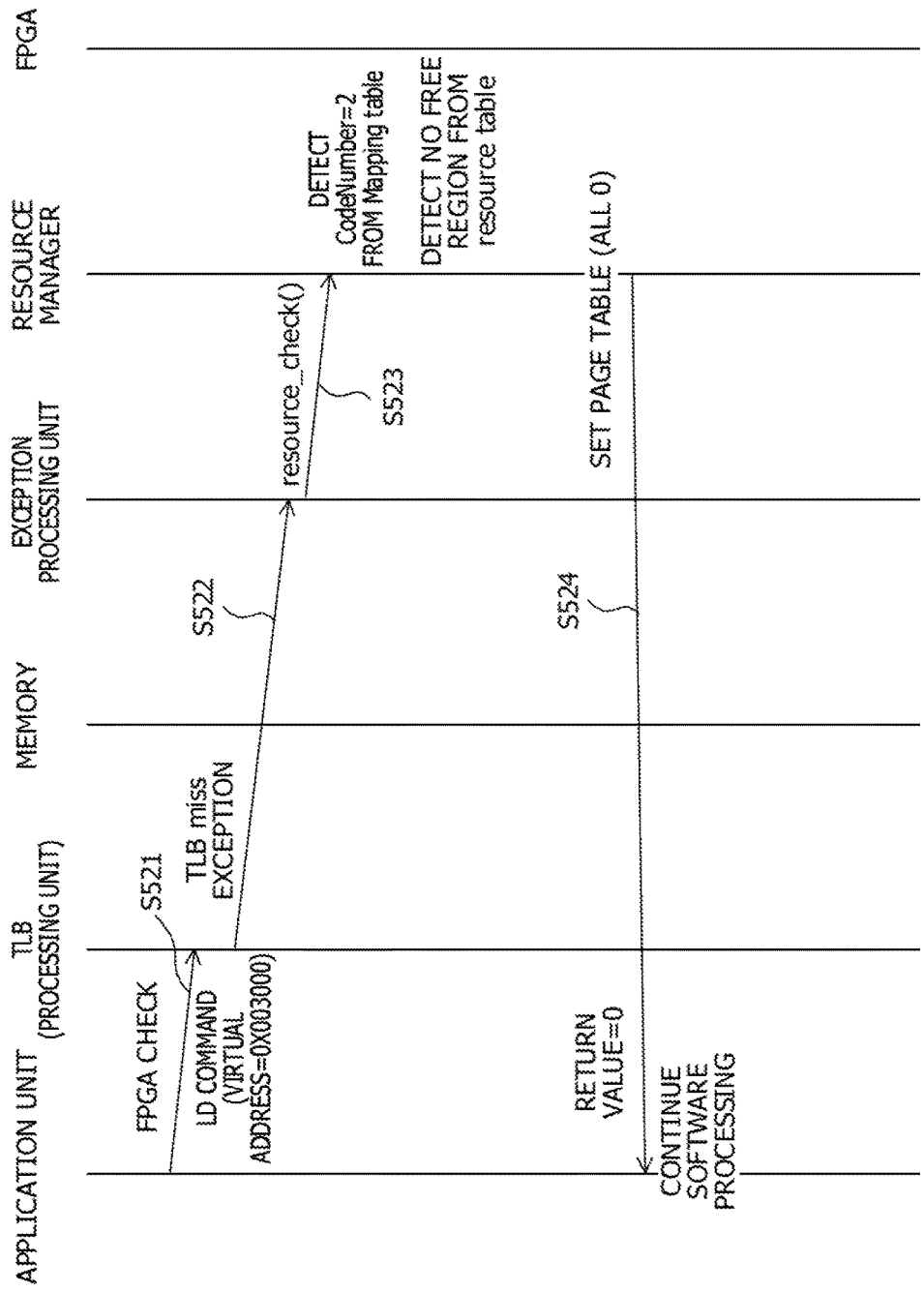
FIG. 6 illustrates an example of a sequence diagram when code is not loaded into an FPGA.

FIG. 6 illustrates an example of a sequence diagram when code is not loaded into an FPGA. FIG. 6 illustrates a case in which the user application 142 executes a certain process using Code#2.

The application unit 112 issues a load (LD) command to read out information from the virtual address corresponding to Code#2 (operation S521). As illustrated in FIG. 3, the virtual address corresponding to Code#2 is 0x003000.

The processing unit 111 searches the TLB 116 based on the virtual address issued by the application unit 112 (operation S522). For example, suppose that the physical address corresponding to the virtual address 0x003000 is not stored in the TLB (TLB miss). The processing unit 111 produces an interrupt, and calls the exception processing unit 114 (operation S522). The exception processing unit 114 calls the resource manager 115 (operation S523).

The resource manager 115 references the mapping table 123, and detects the CodeNumber 2 corresponding to the virtual address 0x003000 (operation S524). The resource manager 115 references the FPGA resource table 122, and searches for an unused region (operation S524). For example, an unused region may not be detected. The resource manager 115 sets the virtual address of the page that includes the virtual address 0x003000 and the corresponding physical address in the page table 124, and writes a value of 0 at the physical address of the memory 121 corresponding to the page that includes the virtual address 0x003000 (operation S524).

The application unit 112 receives 0 as the return value, and thus determines that the FPGA 131-*i* is unusable. The application unit 112 executes the certain process by software processing, without using hardware processing by the FPGA 131-*i*. For example, the application unit 112 itself executes, in software, processing similar to the processing executed by the circuit generated by Code#2 (hardware processing). For this reason, a processing result similar to the case of using the circuit generated by Code#2 is obtained, but since the processing is performed in software, the processing may take more time compared to the case of using the circuit generated by Code#2.

According to the above information processing device, the determination result of whether the FPGA is usable is linked with the result of the TLB search. Since the TLB search is conducted for each LD command in normal access, the overhead for a hit may be reduced.

According to the above information processing device, the overhead for checking whether or not the FPGA is usable may be reduced.

FPGA resources are shared by multiple user applications. In this case, if a resource wait occurs, software processing by the CPU (processing unit) may be faster than hardware processing using the FPGA in some cases.

According to the above information processing device, depending on the utilization of the FPGA, it is determined whether to use hardware processing by the FPGA or software processing by the CPU.

Figure 7:
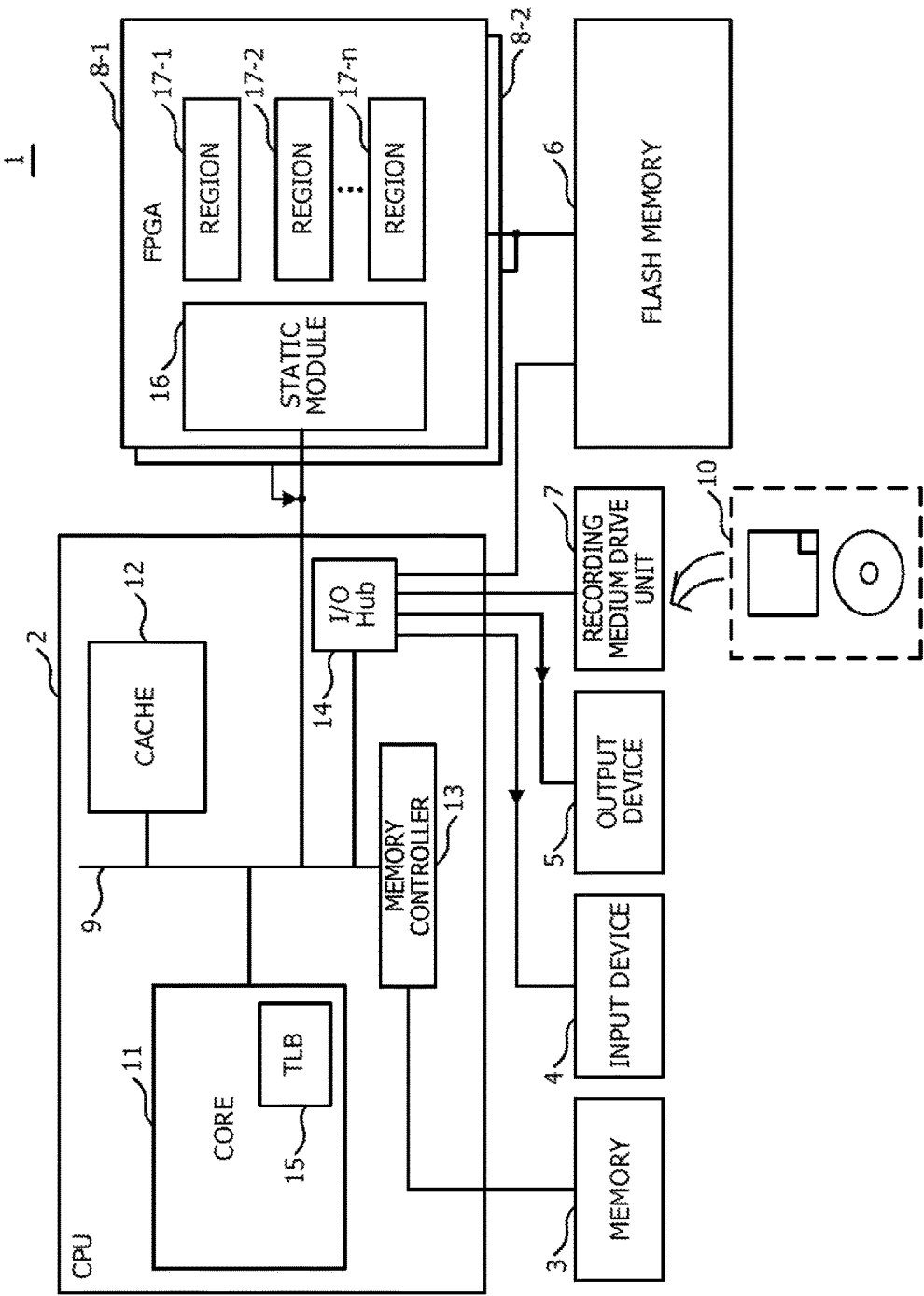
FIG. 7 illustrates an example of hardware of an information processing device (computer).

FIG. 7 illustrates an example of hardware of an information processing device (computer). The information processing device 101 illustrated in FIG. 1 may be realized by the information processing device (computer) 1 as illustrated in FIG. 7, for example.

The information processing device 1 is provided with a CPU 2, memory 3, an input device 4, an output device 5, flash memory 6, a recording medium drive unit 7, and an FPGA 8-$i$. These components are interconnected by a bus.

The CPU 2 is a central processing unit that controls the information processing device 1 overall. The CPU 2 is provided with a core 11, a cache 12, a memory controller 13, and an I/O hub 14. The core 11 is a computational device that performs various processes. The core 11 operates as the application unit 112, the OS unit 113, and the resource manager 115.

The memory 3 is memory such as read-only memory (ROM) or random access memory (RAM) that temporarily stores programs or data stored in the flash memory 6 (or a portable recording medium 10) when executing a program. The CPU 2 executes the various processes discussed above by executing a program using the memory 3. The memory 3 may correspond to the memory 121.

In this case, the program code itself that is read out from the portable recording medium 10 or the like may realize the above functions.

The input device 4 is used to input instructions and information from the user or operator, acquire data used by the information processing device 1, and the like. The input device 4 may be a device such as a keyboard, a mouse, a touch panel, a camera, or a sensor, for example.

The output device 5 is a device which outputs queries to the user or operator and processing results, and which operates under control by the CPU 2. The output device 5 may be a device such as a display or a printer, for example.

The flash memory 6 is a storage device that stores programs and data. The information processing device 1 saves the above programs and data in the flash memory 6, and when appropriate, loads such programs and data into the memory 3 for use. The flash memory 6 corresponds to the flash memory 141. The flash memory 6 may be a device such as a magnetic disk device, an optical disk device, or a tape device, for example.

The recording medium drive unit 7 drives the portable recording medium 10 to access content recorded thereon. For the portable recording medium, an arbitrary computer-readable recording medium may be used, such as a memory card, a flexible disk, a Compact Disc-Read-Only Memory (CD-ROM), an optical disc, or a magneto-optical disc. The user stores the above programs and data on the portable recording medium 10, and when appropriate, loads such programs and data into the memory 3 for use.

The FPGA 8-$i$ is a reconfigurable integrated circuit. The FPGA 8-$i$ may correspond to the FPGA 131-$i$. The FPGA 8-1 is provided with a static module 16 and a region 17-$j$. The static module 16 may correspond to the control unit 132-1. The region 17-$j$ may correspond to the region 133-$i$-$j$. The FPGA 8-2 may also have a configuration similar to the FPGA 8-1.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing device, comprising:
a reconfigurable integrated circuit that, by being loaded with code expressing a configuration of a circuit, functions as the circuit;
a memory that stores first information indicating that the code is loaded into the reconfigurable integrated circuit, and resource information indicating an unused region in which circuit generation is available inside the reconfigurable integrated circuit; and
a processor that searches a translation lookaside buffer (TLB) that is included in a cache memory and associates a virtual address, which is associated with the code, with a physical address of the memory in which second information indicating that the code is loaded into the reconfigurable integrated circuit is stored, determines, when the physical address associated with the virtual address exists in the TLB, that the code is loaded, and generates, when the physical address associated with the virtual address does not exist in the TLB, the circuit expressed by the code in the unused region indicated by the resource information.

2. The information processing device according to claim 1, wherein when generating the circuit in the unused region, the processor sets the physical address of the memory corresponding to the virtual address in the TLB, and writes the second information at the physical address of the memory corresponding to the virtual address.

3. The information processing device according to claim 2, wherein when generating the circuit in the unused region, the processor acquires the second information, and executes the circuit.

4. The information processing device according to claim 1, wherein when the physical address associated with the virtual address does not exist in the TLB, if the unused region does not exist in the reconfigurable integrated circuit, the processor executes, by a software, a process that provides a same function as a function which is provided by the circuit.

5. The information processing device according to claim 1, wherein when the physical address associated with the virtual address does not exist in the TLB, if the unused region exists in the reconfigurable integrated circuit, the processor loads the code into the unused region in the reconfigurable integrated circuit and registers the physical address in the TLB.

6. The information processing device according to claim 1, wherein the first information indicates a code number which identifies the code and the second information indicates a specific value which indicates that the code is loaded into the reconfigurable integrated circuit.

7. An information processing method, comprising:
issuing, by a processor coupled to a memory that stores first information indicating that a code is loaded into a reconfigurable integrated circuit, and resource information indicating an unused region in which circuit generation is available inside the reconfigurable integrated circuit, a command to load information from a virtual address associated with the code expressing a configuration of a circuit in the reconfigurable integrated circuit;
searching, based on the code, a translation lookaside buffer (TLB) that is included in a cache memory and associates the virtual address, which is associated with the code, with a physical address of the memory in which second information indicating that the code is loaded into the reconfigurable integrated circuit is stored;

determining, when the physical address associated with the virtual address exists in the TLB, that the code is loaded into the reconfigurable integrated circuit; and generating, when the physical address associated with the virtual address does not exist in the TLB, the circuit expressed by the code in the unused region, indicated by the resource information, in which circuit generation is available inside the reconfigurable integrated circuit.

8. The information processing method according to claim 7, further comprising:

setting, when generating the circuit in the unused region, the physical address of the memory corresponding to the virtual address in the TLB; and writing the second information at the physical address of the memory corresponding to the virtual address.

9. The information processing method according to claim 8, further comprising acquiring, when generating the circuit in the unused region, the second information, and executes the circuit.

10. The information processing method according to claim 7, further comprising executing, when the physical address associated with the virtual address does not hit in the TLB and the unused region does not exist in the reconfigurable integrated circuit, by a software, a process that provides a same function as a function which is provided by the circuit.

11. The information processing method according to claim 7, further comprising:

loading when the physical address associated with the virtual address does not exist in the TLB, if the unused region exists in the reconfigurable integrated circuit, the code into the unused region in the reconfigurable integrated circuit; and registering the physical address in the TLB.

12. The information processing method according to claim 7, wherein the first information indicates a code number which identifies the code and the second information indicates a specific value which indicates that the code is loaded into the reconfigurable integrated circuit.

13. A non-transitory computer-readable recording medium storing an information processing program which causes a computer to perform a process, the process comprising:

issuing, by a processor coupled to a memory that stores first information indicating that a code is loaded into a reconfigurable integrated circuit, and resource information indicating an unused region in which circuit generation is available inside the reconfigurable integrated circuit, a command to load information from a virtual address associated with the code expressing a configuration of a circuit in the reconfigurable integrated circuit;

searching, based on the code, a translation lookaside buffer (TLB) that is included in a cache memory and associates the virtual address, which is associated with the code, with a physical address of the memory in which second information indicating that the code is loaded into the reconfigurable integrated circuit is stored;

determining, when the physical address associated with the virtual address exists in the TLB, that the code is loaded into the reconfigurable integrated circuit; and generating, when the physical address associated with the virtual address does not exist in the TLB, the circuit expressed by the code in the unused region, indicated by the resource information, in which circuit generation is available inside the reconfigurable integrated circuit.

14. The non-transitory computer-readable recording medium according to claim 13, further comprising:

setting, when generating the circuit in the unused region, the physical address of the memory corresponding to the virtual address in the TLB; and writing the second information at the physical address of the memory corresponding to the virtual address.

15. The non-transitory computer-readable recording medium according to claim 14, further comprising acquiring, when generating the circuit in the unused region, the second information, and executes the circuit.

16. The non-transitory computer-readable recording medium according to claim 13, further comprising executing, when the physical address associated with the virtual address does not exist in the TLB and the unused region does not exist in the reconfigurable integrated circuit, by a software, a process that provides a same function as a function which is provided by the circuit.

17. The non-transitory computer-readable recording medium according to claim 13, further comprising:

loading when the physical address associated with the virtual address does not exist in the TLB, if the unused region exists in the reconfigurable integrated circuit, the code into the unused region in the reconfigurable integrated circuit; and registering the physical address in the TLB.

18. The non-transitory computer-readable recording medium according to claim 13, wherein the first information indicates a code number which identifies the code and the second information indicates a specific value which indicates that the code is loaded into the reconfigurable integrated circuit.

* * * * *